Dec. 30, 1952        A. W. SPICER        2,623,533
FLUID PRESSURE OPERATED INFLATION CONTROL VALVE
Filed May 29, 1948
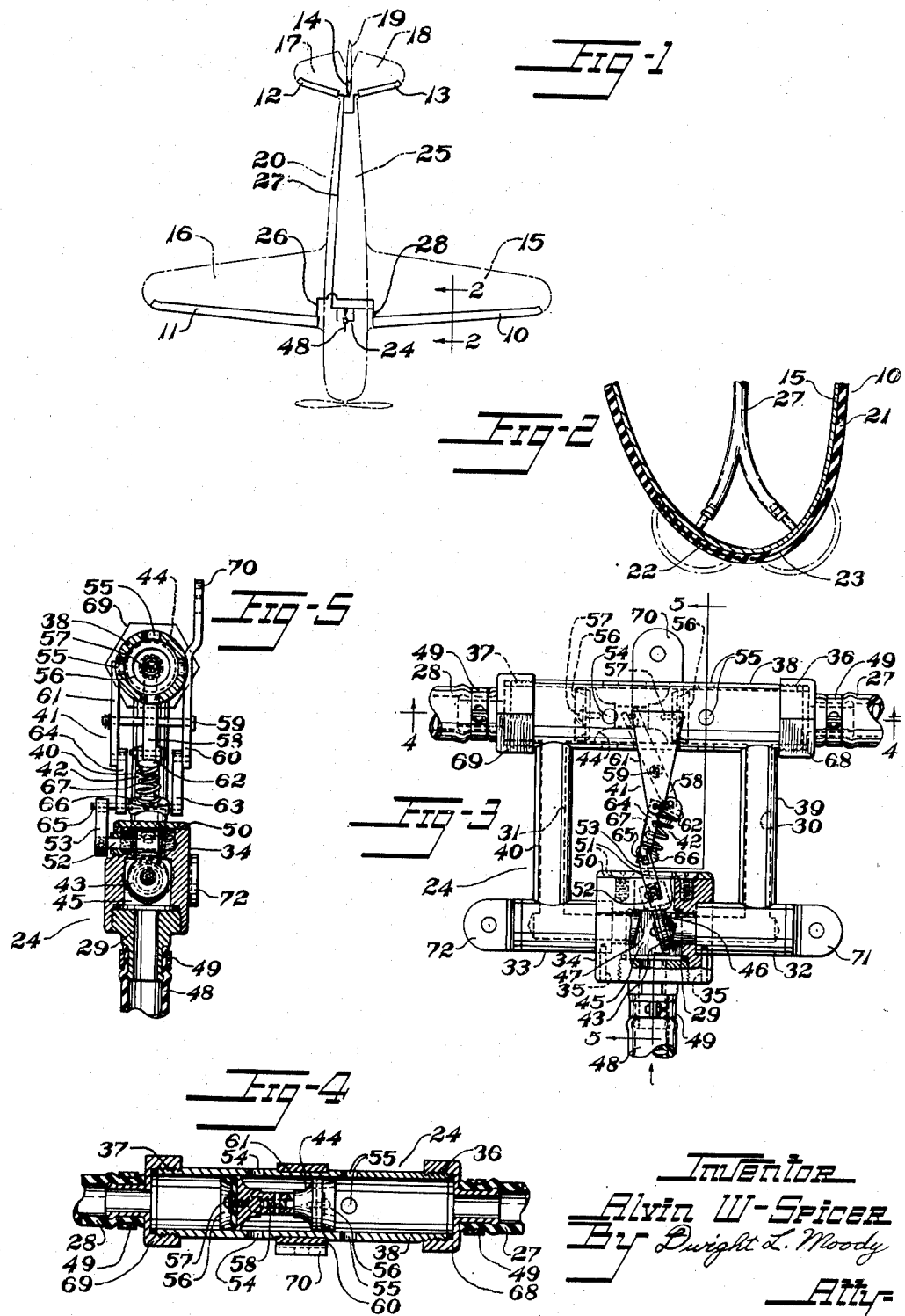
Inventor
Alvin W. Spicer
By Dwight L. Moody
Atty.

Patented Dec. 30, 1952

2,623,533

UNITED STATES PATENT OFFICE 2,623,533

FLUID PRESSURE OPERATED INFLATION CONTROL VALVE

Alvin W. Spicer, Cuyahoga Falls, Ohio, assignor to The B. F. Goodrich Company, New York, N. Y., a corporation of New York Application May 29, 1948, Serial No. 30,171

7 Claims. (Cl. 137—106)

The invention relates to apparatus for inflating distensible units and especially to apparatus for inflating inflatable units or elements adapted to prevent the accumulation of ice upon wings and other airfoils and surfaces of aircraft.

Prior constructions have employed a plurality of inflatable shoes mounted on the wings and other aircraft surfaces and inflated in alternation for ice-removal and other purposes.

This has generally resulted in complicated pressure and exhaust piping systems between the shoes or units, individual control valves at such units, and other operating and timing gear therefor which have been somewhat complex and heavy, thereby adding weight to the aircraft and occupying precious space. For these and other reasons such, for example, as the high cost of the equipment, the prior constructions have not been entirely satisfactory for the intended purpose, especially for application to small, lightweight aircraft of one to three persons capacity, for example.

An object of the invention is to provide means for overcoming these and other disadvantages of the prior constructions.

Other objects of the invention are to provide improved apparatus for inflating and deflating one or more distensible units or elements which apparatus has a toggle or snap-action for this purpose operable in response to a condition of pressure in one or more units; to provide for automatic operation such that the time intervals for the inflation and deflation phases as they actually occur will be commensurate in duration with the actual requirements for the individual units, even though the units are of varying inflation medium capacities; and to provide for self-operation of the apparatus, that is, operation compelled solely by the pressure increase of a fluid inflation medium in the distensible unit.

Further objects are to provide for simplicity of control and for cyclic operation of inflatable units wherein a minimum of piping and other operating connections and mechanisms are required for the units; to provide valve apparatus having over-center toggle action for inflating and deflating an inflatable unit in response to a condition of pressure in the unit; and to provide for simplicity of construction, light weight, convenience and low cost of manufacture and installation, and for effectiveness of operation.

These and other objects and advantages of the invention will be apparent from the following description.

In the accompanying drawings which form a part of this specification and in which like numerals are employed to designate like parts throughout the same, Fig. 1 is a diagrammatic plan view of an aircraft showing a system of inflatable units connected to control means or valve apparatus for operation therewith in accordance with the invention, the outline of the aircraft including fuselage, wings and tail empennage being shown in broken lines, Fig. 2 is a sectional view of an inflatable unit mounted on the leading edge of a wing, the distended condition of the inflatable tubes of the unit being shown in broken lines, Fig. 3 is a front elevational view of the control valve apparatus constructed in accordance with and embodying the invention, parts being broken away and in section, Fig. 4 is a sectional view taken along line 4—4 of Fig. 3, parts being broken away, and Fig. 5 is a sectional view taken along line 5—5 of Fig. 3, parts being broken away.

In the illustrative embodiment of the invention shown in the drawings, distensible or inflatable units or elements 10, 11, 12, 13 and 14 are mounted on the leading edges of the wings 15, 16, the horizontal stabilizers 17, 18 and the vertical stabilizer 19 on an aircraft 20 of the small, lightweight type suitable for flight training, sport and other purposes.

Each inflatable unit comprises a distensible body 21 of resilient rubber or other rubber-like material suitably reinforced and attached to the airfoil surface. The units 10, 11 of the wings may each include two inflatable tubes 22, 23 which may be connected as shown to inflate simultaneously or, if desired, suitably connected to inflate in alternation relative to one another. The units 12, 13 and 14 of the stabilizers of the tail empennage may each include only one inflatable tube. However, the number of tubes in each unit may be provided in accordance with the thickness of the leading edge of the airfoil; hence the number of tubes in each inflatable unit may differ from that described hereinabove according to the requirements of the particular aircraft installation.

For the arrangement illustrated, it is desirable to inflate both wing inflatable units 10, 11 at one time. Also, the inflatable units 12, 13, 14 of the tail group may be inflated simultaneously with respect to one another.

This may be accomplished by connecting the inflatable units, as shown in Fig. 1, to valve means or apparatus 24 which may be located in a fuselage 25 of the aircraft and connected to a source of fluid inflation medium such, for example, as a suitably located compressor (not shown) supplying air under pressure to the system. Each unit which for inflation purposes may be regarded as a tube or group of tubes of an inflatable element, is connected through piping 26, 27, 28 to the valve apparatus 24.

In accordance with the invention the valve apparatus 24 is adapted to effect by a snap-action the successive operations of inflation and deflation which latter phase may be exhausted to atmosphere or, if desired, to suction, or both. The successive operations are under the control largely of the condition of pressure in the inflatable unit; hence the functioning of the valve apparatus 24 is automatic to the extent that the time intervals for the inflation and deflation phases as they actually occur will be commensurate in duration with the actual requirements for the individual units, even though the units are of varying air capacities.

The construction of the apparatus 24 or valve structure shown especially in Figs. 3, 4 and 5 includes inlet means comprising a pair of inlet passages or tubes 30, 31 of impervious, strong, and stiff material such, for example, as aluminum tubing, which are connected at their adjacent base or end portions 32, 33 to an inlet valve 34, screw fasteners 35, 35 securely holding the end portions in engaged relation to the inlet valve. The inlet tubes 30, 31 which may be generally L-shaped in plan as shown especially in Fig. 3, have threaded connections 36, 37 at their other ends for a pair of the inflatable units. The valve structure includes outlet means desirably comprising an outlet passage or tube 38 of suitable tubing connected to and in communication with leg portions 39, 40 of the inlet tubes 30, 31 at positions spaced from the inlet valve and desirably adjacent the connections 36, 37, whereby the outlet or exhaust tube 38 may be disposed generally parallel to the base portions 32, 33. The arrangement provides space between the tubes and the inlet valve for a lever mechanism 41 including an over-center toggle 42 which is connected with an oscillating disc member 43 of the inlet valve and a reciprocating piston 44 in the outlet tube 38.

A hollow connector 29 threadedly engages the hollow body of the valve 34 and closes the bottom of a valve chamber 45 in which the disc member 43 having contact faces of resilient rubber material oscillates for sealing against inclined valve seats or end faces 46, 47 of the base portions 32, 33 of the inlet tubes. A suitable flexible conduit 48 such, for example, as reinforced rubber hose for conducting the fluid inflation medium which may be air under pressure from the compressor, may be attached to the connector 29 as by an adjustable clamp fastener 49. A cover plate 50 held in place as by screw fasteners 51, 51 threadedly engaging the body of the valve, closes the top of the valve chamber 45.

The disc member 43 is secured to a shaft 52 which is pivotally mounted on the valve adjacent the cover plate 50 and extends into the chamber 45 from a side of the valve 34 for facilitating connection of the shaft 52 to the over-center toggle 42 by a lever 53. Swinging movement of the lever 53 is compelled by the functioning of the toggle and causes rotation of the shaft so as to oscillate the disc member in the chamber into sealing contact with the end faces 46, 47 of the tubes thereby opening and closing the inlet tubes in alternation for inflating and deflating the inflatable units.

For deflation purposes the outlet tube 38 has a plurality of circumferentially spaced-apart apertures or exhaust ports 54, 54 through its wall which apertures are axially spaced-apart from a second plurality of circumferentially spaced-apart apertures or exhaust ports 55, 55 in the tube. The two groups of apertures preferably exhaust to the atmosphere, although, if desired, they may communicate with a source of suction (not shown) for assuring maintenance of the inflatable units in the deflated condition. The apertures 54, 55 cooperate with the reciprocating piston 44 of the double-ended type in providing outlet valve means of the apparatus 24.

The piston 44 has valve cups 56, 56 of suitable rubber material secured as by screws 57, 57 to opposite end portions of the piston for yieldingly sealing against the wall of the outlet tube. The piston is constructed and arranged to slide in the tube 38 for opening and closing the apertures with respect to the pair of inflatable units.

The outlet valve means construction is such that when the piston slides axially in one direction in response to a condition of pressure in an inflatable unit, that one group of apertures, for example 55, 55 is in the open condition in direct communication with the unit and the atmosphere, while the other group of apertures 54, 54 is in the closed condition. This permits deflation of the unit while the other unit is inflating. The deflation phase continues until the back pressure in the other inflatable unit compels movement of the piston in the opposite axial direction so that the apertures 55, 55 are closed with respect to the deflated unit for inflation of the latter and the apertures 54, 54 are opened with respect to the inflated unit for deflation of the latter. In this manner, the operation of the piston to open and close the exhaust ports of the outlet valve means is automatic and responsive solely to a condition of pressure in an inflatable unit.

For compelling coincidental movement of the piston 44 and the disc member 43, the lever mechanism 41 has a lever 58 connected pivotally at its ends to the piston and to an upper plate element 62 of the over-center toggle 42 and mounted rotatably intermediate its ends upon a shaft 59 carried by spaced-apart metal support brackets 60, 61 suitably attached as by welding to the outlet tube 38 between the exhaust ports 54, 55. The lever 58 extends through a suitable elongated slot in the outlet tube and is connected to the piston intermediate the ends thereof.

Spaced-apart connecting links 63, 64 pivotally supported by the brackets 60, 61 carry at their lower ends a shaft 65 upon which is fixedly mounted a lower plate element 66 of the toggle positioned between the links, a compression spring 67 being disposed between the upper 62 and lower 66 plate elements for facilitating the snap-action of the over-center toggle. The extent of compression of the spring utilized establishes the magnitude of back pressure in the inflatable unit at which the piston is compelled to move. The shaft 65 pivotally engages the upper end of the lever 53 so that as the links 63, 64 swing in response to movement of the toggle due to movement of the lever 58 with the piston, the lever 53 swings also to oscillate the disc member 43 of the inlet valve for opening and closing the latter valve. The lever mechanism 41 including the toggle 42 thus interconnects the inlet and outlet valves so that the inflatable unit is connected to these valves in alternation in response to a condition of pressure in the unit for inflating and deflating the unit.

Threaded connectors 68, 69 may detachably engage the end connections 36, 37 of the inlet tubes to which connectors may be attached the piping 27, 28 such, for example, as suitable rubber hose as by the adjustable clamp fasteners 49, 49. The piping 26 to the wing inflatable unit 11 may be suitably connected to the piping 27 adjacent the valve structure for inflation simultaneously with the wing inflatable unit 10.

The support bracket 60 and the base portions 32, 33 of the inlet tubes 30, 31 may be provided with apertured plate extensions 70, 71 and 72 for facilitating mounting the valve structure 24 upon the aircraft as by bolts and nuts or screw fasteners.

In the operation of the valve structure and inflatable units connected as shown in Fig. 1 and having the valve structure in the position shown in Figs. 2, 3 and 4, the inflation medium entering the inlet valve through the connector 29 and hose 48 flows through the inlet passage 31 and thence to both wing inflatable units 10 and 11 for inflating the same and distending the tubes 22, 23 substantially as shown in Fig. 2 in broken lines. At the same time the tail or stabilizer inflatable units 12, 13 and 14 are in communication with the atmosphere through the open exhaust ports 55 of the outlet tube for deflation purposes.

When the tubes of both wing inflatable units 10 and 11 are distended and sufficient pressure builds up in the inflatable units to act upon and compel axial movement of the piston 44 toward the leg portion 39 of the other inlet tube 30, such movement opens the exhaust ports 54, 54 and closes the other exhaust ports 55, 55 which permits deflation of both wing inflatable units 10 and 11 and inflation of the tail inflatable units 12, 13, 14 to take place. Simultaneously with movement of the piston 44 the lever mechanism 41 including the over-center toggle is actuated thereby causing the disc member 43 of the inlet valve to oscillate and close the inlet tube 31 and open the other inlet tube 30. This admits the inflation medium to all the tail inflatable units 12, 13, 14 thereby distending the tubes thereof.

When the tail inflatable units reach the desired condition of pressure the piston is again acted upon and responds to the same so that the piston moves axially in the other direction toward the leg portion 40 of the inlet tube 31 until the exhaust ports 55, 55 are opened for deflating the tail inflatable units and the other exhaust ports 54, 54 are closed for the next inflation of the wing inflatable units 10 and 11. As before, the movement of the piston actuates the lever mechanism but in the reverse direction so as to oscillate the disc member to close the inlet tube 30 and open the inlet tube 31 and admit the inflation medium through the tube 31 to both wing inflatable units 10 and 11. The hereinabove described operations of the valve structure are repeated automatically in sequence and solely in response to the condition of pressure in the respective inflatable units connected to the valve structure.

The invention advantageously has provision for simplified piping connections between the units and the valve structure, lightweight construction of the valve structure, and reliability and effectiveness of automatic operation for inflating and deflating the units in accordance with their capacities, all of which features are highly desirable for aircraft usage, especially small, lightweight aircraft.

Variations may be made without departing from the scope of the invention as it is defined in the following claims.

I claim:

1. Valving means for controlling the flow of an inflation medium into and out of a pair of inflatable elements, said means comprising a pair of inlet tubes, an inlet valve interconnecting adjacent ends of said inlet tubes and having a supply inlet for communication with a source of supply of the inflation medium and having a disc member mounted for oscillating movement so as to admit the inflation medium from said supply inlet in alternation into said adjacent ends of said inlet tubes, an exhaust tube including a cylindrical chamber therein connected to and in communication with both said inlet tubes at positions thereon spaced from said inlet valve and having exhaust ports in the wall of said chamber spaced-apart in the direction axially of said exhaust tube, a reciprocating piston in said chamber movable from the position of one of said ports to the position of the other port for alternately covering and uncovering said ports in response to difference in pressure in the ends of said exhaust tube, a support on said exhaust tube, a lever pivotally mounted intermediate its ends on said support and attached at one end to said piston for movement therewith, a second lever connected at one end to said oscillating disc member, and an over-center toggle interconnecting the other ends of said levers so that movement of said piston in response to said difference in pressure in said ends of said exhaust tube compels by virtue of the snap-action of said toggle quick oscillating movement of said disc member for opening and closing in alternation said adjacent ends of said inlet tubes.

2. Valving means as defined in claim 1 in which said reciprocating piston in said cylindrical chamber has axially spaced-apart end portions constituting head ends subject to said difference in pressure for moving said piston to cover and uncover said exhaust ports and has a reduced portion interconnecting said head ends, and in which said wall of said cylindrical chamber has an axial slot for receiving and accommodating axial movement of the first said lever, and in which said first said lever at said one end thereof extends through said slot into said chamber and is pivotally connected to said reduced portion of said piston for movement therewith.

3. Valving means for controlling the flow of an inflation medium into and out of a pair of inflatable elements, said means comprising a pair of tubular inlet passages, an inlet valve interconnecting adjacent ends of said inlet passages and having a supply inlet for communication with a source of supply of the inflation medium and having a movable member therein mounted for movement such as to admit the inflation medium from said supply inlet in alternation into said adjacent ends of said inlet passages, a tubular exhaust element interconnecting and in communication with both said inlet passages at positions thereon spaced from said inlet valve and having spaced-apart exhaust ports therein, a second fluid pressure responsive movable member mounted within said exhaust element and movable from the position of one of said ports to the position of the other port for alternately covering and uncovering said ports in response to difference in pressure in the ends of said exhaust element, a support on said exhaust element, a lever pivotally mounted intermediate its ends on said support and attached at one end thereof to said second movable member for movement therewith, a second lever connected at one end to said movable member of said inlet valve, and an over-center toggle interconnecting the other ends of said levers so that movement of said second fluid pressure responsive movable member to and from said exhaust ports in response to said difference in pressure in said ends of said exhaust element compels by virtue of the snap-action of said toggle quick movement of said movable member of said inlet valve for opening and closing in alternation said adjacent ends of said inlet passages.

4. Valving means for controlling the flow of an inflation medium into and out of a pair of inflatable elements, said means comprising a pair of inlet passages, an inlet valve having outlets in communication with said inlet passages and having a supply inlet for communication with a source of supply of the inflation medium and said valve having closure means movable to admit the inflation medium from said supply inlet through said outlets in alternation to said inlet passages, an exhaust passage in communication with both said inlet passages at positions thereon to each outlet side of said valve and having spaced-apart exhaust ports therein, a fluid pressure responsive movable member mounted in said exhaust passage and movable from the position of one of said ports to the position of the other port for alternately covering and uncovering said ports in response to difference in pressure in the ends of said exhaust passage, and a lever mechanism including an over-center toggle interconnecting said closure means and said movable member for opening and closing said closure means in response to movement of said movable member to and from said exhaust ports.

5. Valving means for controlling the flow of an inflation medium into and out of an inflatable element, said means comprising an inlet passage for communication with a source of supply of the inflation medium, a valve in said passage providing an outlet communicating with said passage, an exhaust passage including an exhaust port therein in communication with said inlet passage at a position thereon to the outlet side of said valve, a fluid pressure responsive movable member mounted within said exhaust passage and movable to and from the position of said port to cover and uncover the port in response to a condition of pressure in the communicating end of said exhaust passage, and a lever mechanism including an over-center toggle interconnecting said valve and said movable member for opening and closing said valve in response to movement of said movable member to and from said exhaust port so as to establish communication with said source of supply through said inlet passage and said valve and with said exhaust port in alternation.

6. Valving means for controlling the flow of an inflation medium into and out of a pair of inflatable elements, said means comprising a supply conduit for communication with a source of supply of the inflation medium, a pair of inlet passages, inlet valve structure in communication with said conduit and said passages and including closure means movable to admit the inflation medium from said conduit in alternation to said inlet passages, an exhaust passage in communication with said inlet passages and having spaced-apart exhaust ports therein, a fluid pressure responsive movable member in said exhaust passage movable from the position of one of said ports to the position of the other port for alternately covering and uncovering said ports in response to difference in pressure in the ends of said exhaust passage, and a lever mechanism including an over-center toggle interconnecting said closure means and said movable member for opening and closing said closure means in response to movement of said movable member to and from said exhaust ports.

7. A pressure responsive self-shifting inflating valve assembly comprising a body having a supply port for communication with a source of supply of an inflation medium, a pair of inlet passages for communication with said supply port, means for connecting a closed work chamber to each inlet passage, valve means for alternately establishing communication between one of said inlet passages and said supply port and for blocking the other of said inlet passages from said supply port, a double-acting fluid pressure operated motor including a fluid chamber and piston means movable in said fluid chamber, said fluid chamber being connected to said inlet passages at opposite sides of said piston means, exhaust ports for each inlet passage alternately opened and closed by said piston means as it moves from one position to another position in said fluid chamber, an over-center connection including a snap spring between said piston means and said valve means arranged so that when said piston means is in one position the exhaust port for one inlet passage is opened and said valve means is positioned by said piston means and said over-center connection to close off said one inlet passage from said supply port and the other exhaust port is closed by said piston means with the other inlet passage in communication with the supply port, the fluid connections between said passages and ports being reversed when said piston means is moved to its other position in said fluid chamber, said piston means when in such other position thereof being responsive to fluid pressure in that inlet passage in communication with the supply port with motion of said piston means in response to such fluid pressure being resiliently opposed by the snap spring of said over-center connection.

ALVIN W. SPICER.

REFERENCES CITED

The following references are of record in the file of this patent:

UNITED STATES PATENTS

| Number | Name | Date |
|---|---|---|
| 1,681,588 | Lawson | Aug. 21, 1928 |
| 2,075,959 | Previti | Apr. 6, 1937 |
| 2,330,151 | Smith | Sept. 21, 1943 |
| 2,374,437 | Kerry | Apr. 24, 1945 |